Figure 2:
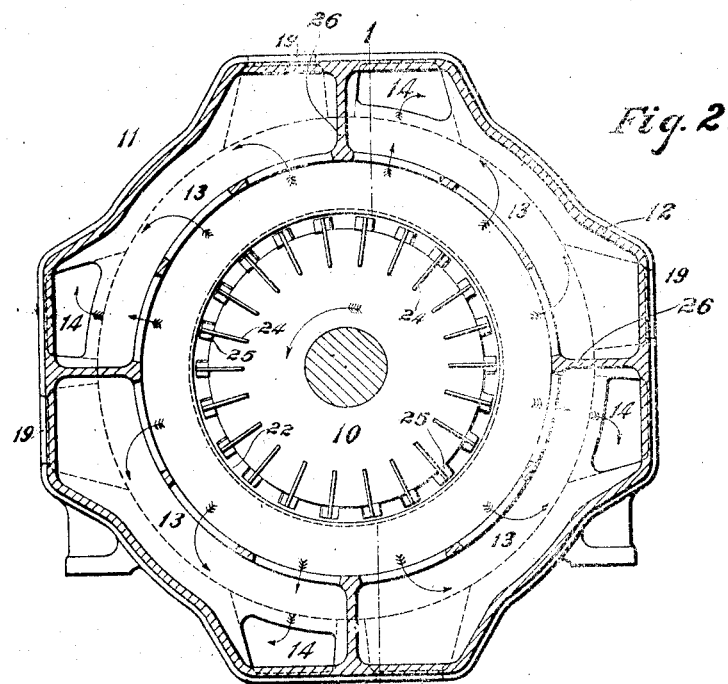

No. 876,568. PATENTED JAN. 14, 1908.
C. E. LORD.
DYNAMO ELECTRIC MACHINE.
APPLICATION FILED JUNE 7, 1905.
3 SHEETS—SHEET 1.
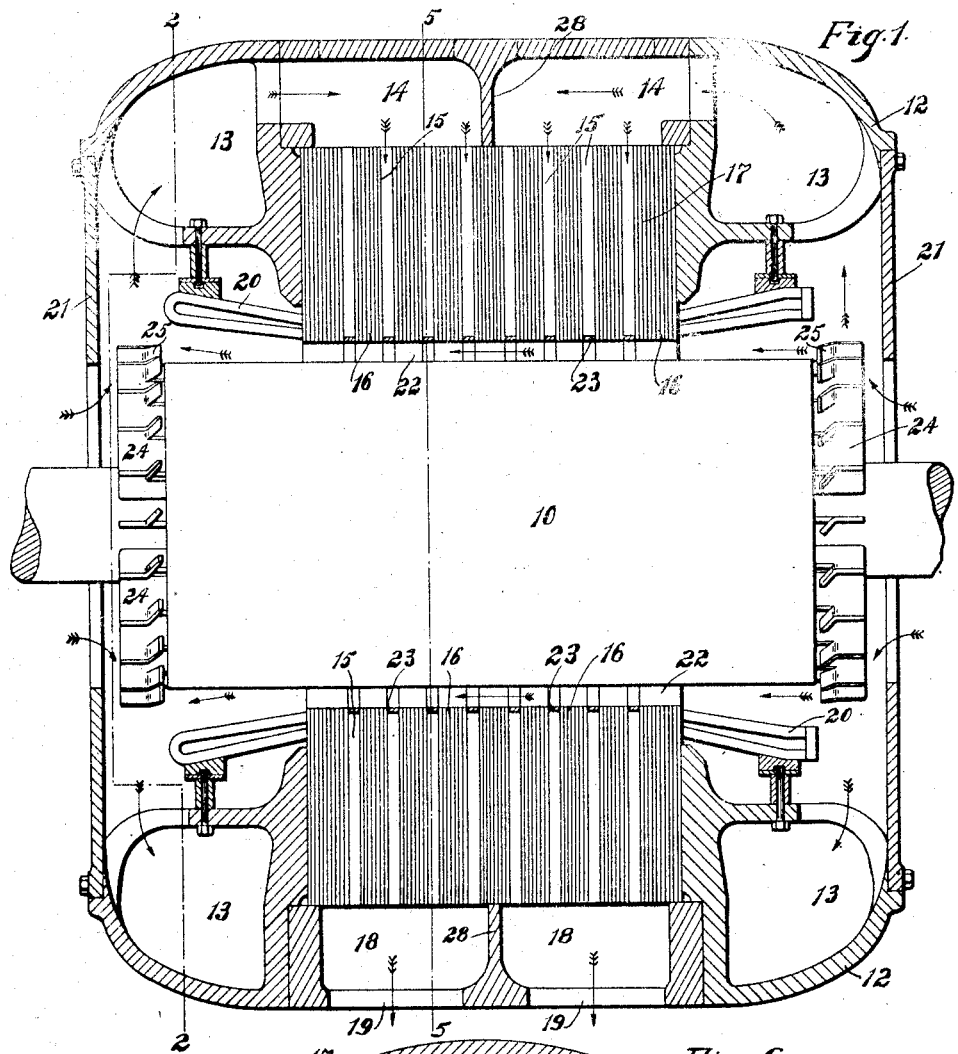
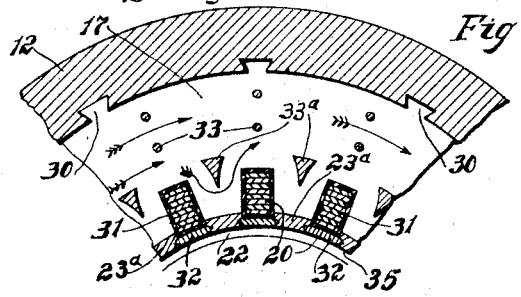
Witnesses:
Oliver W. Sharman
Fred J. Kinsey
Inventor:
Chas. E. Lord No. 876,568.    PATENTED JAN. 14, 1908.
C. E. LORD.
DYNAMO ELECTRIC MACHINE.
APPLICATION FILED JUNE 7, 1905.

3 SHEETS—SHEET 2.

Witnesses
Oliver W. Shannan
Fred J. Kinsey

Inventor
Chas. E. Lord

No. 876,568. PATENTED JAN. 14, 1908.
C. E. LORD.
DYNAMO ELECTRIC MACHINE.
APPLICATION FILED JUNE 7, 1905.

3 SHEETS—SHEET 3.

Witnesses

Inventor
Chas. E. Lord

UNITED STATES PATENT OFFICE.

CHARLES E. LORD, OF NORWOOD, OHIO, ASSIGNOR TO THE BULLOCK ELECTRIC MANUFACTURING COMPANY, A CORPORATION OF OHIO.

DYNAMO-ELECTRIC MACHINE.

No. 876,568.

Specification of Letters Patent.

Patented Jan. 14, 1908.

Application filed June 7, 1905. Serial No. 264,158.

*To all whom it may concern:*

Be it known that I, CHARLES E. LORD, citizen of the United States, residing at Norwood, in the county of Hamilton and State of Ohio, have invented certain new and useful Improvements in Dynamo-Electric Machines, of which the following is a full, clear, and exact specification.

My present invention relates to improvements in the construction of dynamo-electric machines, particularly high-speed turbo-generators, and means for ventilating same.

In the types of dynamo-electric machines most commonly employed at the present time the rotatable member is provided with connecting axial and radial passageways, and the stationary member is provided with radial passageways through its core and between its windings. The passageways are so arranged that when the machine is in operation, the ventilating currents of air enter the rotatable member through said axial passage-ways, thence flow through the radial passage-ways of said member into the air-gap of the machine, thence through the passage-ways of the stationary member and out of the machine through openings in the periphery of its frame or yoke. In high speed machines and particularly in turbo-generators, in which the rotatable member has a comparatively small diameter, it is practically impossible with the construction just described to force enough air across the air-gap to ventilate the machine, or to ventilate properly the core and windings of the stationary member. Furthermore with such a construction when the machine is run at high speeds the air flowing at an extremely high velocity through the passageways of the machine, and the streams of air flowing from the radial passage-ways of the rotatable member and impinging upon the windings and other projecting portions of the stationary member produce a very disagreeable and extremely objectionable noise.

The object of my invention is to construct a dynamo-electric machine and the ventilating passage-ways there-through, so that sufficient air to ventilate all parts properly may be readily supplied to the machine and the noise due to the flow of air may be reduced to a minimum.

In carrying out my invention, I provide the stationary member of the machine with passage-ways through which a cooling medium is adapted to be forced, and means for confining said cooling medium to said passage-ways while on its way through the stationary member so as to prevent the cooling medium from passing from said passage-ways in the stationary member into the air-gap between the stationary and rotatable member, or vice versa. The rotatable member is preferably provided with means for forcing the cooling medium through the passage-ways in the stationary member, but these means may be external to the machine if so desired.

In another aspect my invention consists of a dynamo-electric machine having a rotatable and a stationary member, the latter being provided with ventilating passage-ways arranged substantially concentrically about the axis of the rotatable member and also having means for cutting off direct communication between said passageways and the air-gap of the machine.

The invention further consists of improvements in details of construction and in novel combinations of parts which will be hereinafter described and more specifically pointed out in the appended claims.

Figure 3:
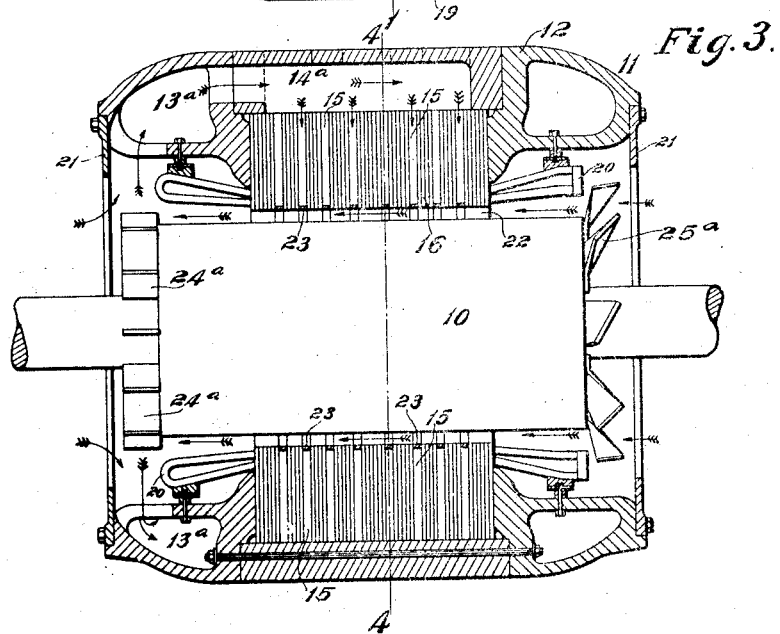
Figure 4:
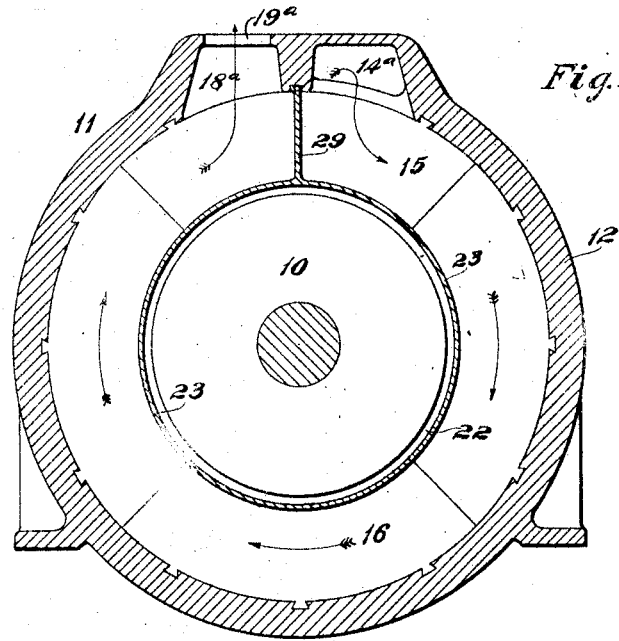
Figure 5:
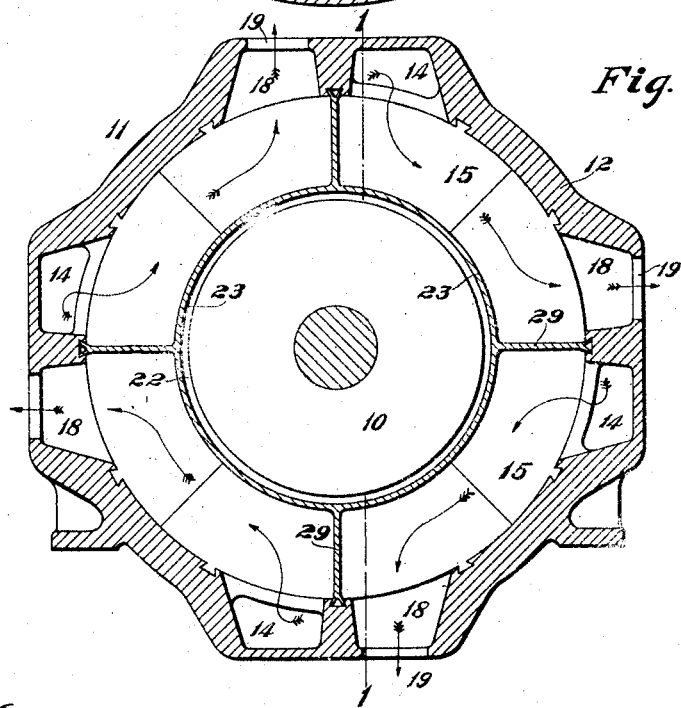

Referring to the accompanying drawings which illustrate preferred embodiments of my invention, Figure 1 is a longitudinal section of a high speed turbo-generator constructed in accordance with my invention; Fig. 2 is a section on a reduced scale on the line 2—2 of Fig. 1; Fig. 3 is a longitudinal section of a machine constructed in accordance with a modified form of my invention; Fig. 4 is a section on the line 4—4 of Fig. 3; Fig. 5 is a section on a reduced scale on the line 5—5 of Fig. 1; and Fig. 6 is a detail sectional view illustrating on a larger scale one arrangement of the ventilating ducts or passageways through the stationary member of the machine.

In the preferred form of my invention illustrated in Figs. 1, 2, and 5, the rotatable member or field magnet is indicated by 10, and the stationary member or armature by 11. It will be understood that the field magnet may be stationary and the armature may rotate, if desired. The stationary member comprises the frame, or yoke 12 provided with passage-ways 13 and 14, which conduct the currents of air from its source of supply to the passageways 15 formed between the groups of laminations 16 of the core 17. The frame 12 is also provided with the passage-ways 18 communicating with openings 19 at the periphery of the frame and forming the exit for the air currents after they have passed through the passageways of the stationary member. Said stationary member also supports in any desired manner the windings 20. To assist in confining the currents of air to the passage-ways in the frame of the machine, I provide the end heads 21. The blast of air in its passage through the core of the stationary member is confined to said passage-ways; that is to say, it is prevented from entering the air-gap 22 of the machine. This may be accomplished in any desired manner, preferably by means of strips or plugs 23 which block the passageways in said core between the windings 20 and cut off a direct communication between the air-gap and the passage-ways 15. The latter passage-ways are, as will be observed, arranged substantially concentrically about the axis of the rotatable member and the air enters said passage-ways at the periphery of the machine, and flows out again at the periphery without passing across or through the air-gap 22.

The desired current or blast of air through the passage-ways of the stationary member is preferably produced by the radially arranged fan blades 24, mounted upon the ends of the rotatable member 10. However, this source of air supply may be entirely independent of the machine, if desired. To produce a ventilating current or blast of air through the air-gap 22 I provide the angularly arranged fan-blades 25 also mounted upon the ends of the rotatable member. These blades are constructed to produce a current of air over the periphery of said rotatable member in a direction substantially parallel to the axis of said member. The rotatable member may, if desired, be provided with the ordinary connecting axial and radial ventilating openings for ventilating the interior thereof.

In the operation of the machine as constructed according to Figs. 1, 2, and 5, the air-currents for the air-gap flow as indicated by the arrows, being forced by the angularly arranged fan-blades 25. The air for ventilating the stationary member flows from radial fan blades 24 into the passageways 13 toward the periphery of the machine in the directions indicated by the arrows in Fig. 2. As shown in Fig. 2, the passageways 13 are four in number, communicating with the passageways 14 but separated from each other by the partitions 26. Any desired number of these passage-ways may be employed. The air enters said passage-ways 14 from passageways 13 at each end of the machine and from thence flows into the passageways 15, (as indicated by arrows in Fig. 5) substantially concentrically about the axis of the machine, toward the exit passage-ways 18 and openings 19 in the periphery of the machine frame. The passage-ways 14 leading from opposite ends of the machine are preferably separated from each other by the partitions 28. The air is constrained to follow the paths through passageways 15, as indicated in Fig. 5, by means of the separating strips or plugs 23 and the partitions 29.

In the modification illustrated in Fig. 3, the angularly arranged fan-blades for producing the blast of air through the air-gap are mounted upon one end of the rotatable member 10 at 25$^a$, and the radially arranged blades 24$^a$ for producing the current of air for ventilating the stationary member are mounted upon the opposite end of said rotatable member. In this case the blast of air flows from the radially arranged blades into the receiving passage-way 13$^a$ from which it passes into the single passage-way 14$^a$, thence into the passageways 15, sweeping completely around the machine, as shown by the arrows in Fig. 4, and leaving same through the passage-ways 18$^a$ and out through the openings 19$^a$ in the periphery of the frame. In this arrangement, but a single guiding partition 29 is employed, making a simple arrangement of passage-ways through the stationary member.

Various means may be employed for cutting off the direct communication between the passage-ways 15 and the air-gap 22. One construction which may answer for this purpose is shown in Fig. 6, in which the frame of the machine is indicated at 12. The laminations of the core 17 are dove-tailed into said frame at 30. Said laminations are slotted at 31 to receive the windings 20 which are held in place in the slots by the wedges 32. These wedges also serve to hold the short plug-pieces 23$^a$ which prevent the flow of air from passage-ways 15 through the windings into the air-gap 22, or vice versa. The wedges and plugpieces are preferably so constructed that they present a substantially smooth cylindrical surface 35, when assembled in the machine. To maintain the groups of laminations properly spaced apart to form the passage-ways 15, ventilating segments carrying the separating blocks 33 and 33$^a$ are provided.

In the appended caims I aim to cover all modifications which do not depart from the spirit of the invention and I do not desire to limit myself to the specific arrangements illustrated and described herein.

Having thus described my invention, what I claim as new and desire to secure by Letters Patent is—

1. In a dynamo-electric machine, a stationary member having a core formed of groups of laminæ spaced apart to provide ventilating passage-ways through which a cooling medium is adapted to be forced, means for forcing a cooling medium through said passage-ways, a rotatable member, and means for preventing said cooling medium from passing from the passage-ways in said stationary member into the air-gap between the stationary member and the rotatable member.

2. In a dynamo-electric machine, a stationary core made up of groups of laminæ spaced apart to form ventilating passageways therebetween, a rotatable member, means for forcing a blast of air through said passage-ways, and means for preventing said blast of air while passing through said stationary core from entering the air-gap between the rotatable member and stationary core.

3. In a dynamo electric machine, a stationary member provided with ventilating passage-ways, a rotatable member, means for causing a current of air to flow through the air-gap between said members and a current of air to flow through said ventilating passage-ways, and means for preventing the latter current of air, while passing through the stationary member, from entering said air-gap.

4. In a dynamo-electric machine, a rotatable field-magnet, and a stationary armature having a core formed of groups of laminæ spaced apart to provide ventilating passage-ways which permit a flow of air from the periphery of the machine through said passage-ways and out again at the periphery of the machine, in combination with means for confining the air to said passage-ways in its passage through said stationary armature core so as to prevent same from entering the air-gap between the rotatable field-magnet and the armature.

5. In a dynamo-electric machine, a rotatable field-magnet, and a stationary armature having ventilating passage-ways which permit a flow of air from the periphery of the machine through said passageways and out again at the periphery of the machine, in combination with means for confining the air to said passage-ways while flowing through said stationary armature so as to prevent same from entering the air-gap between the rotatable field-magnet and the armature, and means for causing a flow of air over the periphery of the field-magnet substantially parallel to the axis thereof.

6. In a dynamo-electric machine, a rotatable field-magnet, and a stationary armature having ventilating passage-ways which permit a flow of air from the periphery of the machine through said passage-ways and out again at the periphery of the machine, in combination with means for confining the air to said passage-ways while flowing through said stationary armature so as to prevent same from entering the air-gap between the rotatable field-magnet and the armature, and means carried by the field-magnet for forcing a current of air through said passage-ways and for forcing a flow of air over the periphery of the field magnet substantially parallel to the axis thereof.

7. In a dynamo-electric machine, a rotatable member, a stationary member having a core formed of groups of laminæ spaced apart to provide ventilating passage-ways arranged substantially concentrically about the axis of said rotatable member, and means for cutting off direct communication between the said passage-ways and the air-gap of the machine.

8. In a dynamo-electric machine, a rotatable member, a stationary member provided with ventilating passage-ways arranged substantially concentrically about the axis of said rotatable member, means for cutting off direct communication between the said passage-ways and the air-gap of the machine, and means for producing an axial ventilation through said air-gap.

9. In a dynamo-electric machine, a rotatable member, a stationary member provided with ventilating passage-ways arranged substantially concentrically about the axis of said rotatable member, means for cutting off direct communication between the said passage-ways and the air-gap of the machine, and fan blades carried by the rotatable member for producing an axial current of air through said air-gap.

10. In a dynamo-electric machine, a rotatable member, a stationary member provided with ventilating passage-ways arranged substantially concentrically about the axis of said rotatable member, means for cutting off direct communication between the said passage-ways and the air-gap of the machine, fan blades carried by the rotatable member for producing an axial current of air through said air-gap, and means also carried by the rotatable member for forcing a current of air through said passageways.

11. In a dynamo-electric machine, a rotatable field-magnet, a stationary armature having ventilating passage-ways which permit a flow of air from the periphery of the machine through said passage-ways and out again at the periphery of the machine, in combination with means for confining the air to said passageways while flowing through said stationary armature so as to prevent same from entering the air-gap between the rotatable field-magnet and the armature, radially arranged fan-blades mounted upon the end of the field-magnet for forcing a current of air to the periphery of the machine, and means for conducting said current of air to the passage-ways in said stationary armature.

12. In a dynamo-electric machine, a rotatable field-magnet, a stationary armature having ventilating passage-ways which permit a flow of air from the periphery of the machine through said passage-ways and out again at the periphery of the machine, in combination with means for confining the air to said passage-ways while flowing through said stationary armature so as to prevent same from entering the air-gap between the rotatable field-magnet and the armature, radially arranged fan blades mounted upon the end of the field-magnet for forcing a current of air to the periphery of the machine, means for conducting said current of air to the passage-ways in said stationary armature, and angularly arranged fan blades also carried by said field-magnet for producing a current of air axially over the periphery of the field-magnet.

13. In a dynamo-electric machine, a rotatable field-magnet, a stationary armature having ventilating passage-ways which permit a flow of air from the periphery of the machine through said passage-ways and out again at the periphery of the machine, in combination with means for confining the air to said passage-ways while flowing through said stationary armature so as to prevent same from entering the air-gap between the rotatable field magnet and the armature, radially arranged fan-blades mounted upon the end of the field-magnet for the purpose of forcing a current of air to the periphery of the machine, means for conducting said current of air to the passage-ways in said stationary armature, and means also carried by the field-magnet for producing a current of air through the air-gap of the machine.

14. In a dynamo-electric machine, a rotatable member, a stationary member provided with ventilating passage-ways arranged substantially concentrically about the axis of said rotatable member, windings in said stationary member, means for preventing a flow of air from said passage-ways through said windings into the air-gap, or vice versa.

15. In a dynamo-electric machine, a rotatable member, a stationary member provided with ventilating passage-ways arranged substantially concentrically about the axis of said rotatable member, windings in said stationary member, and plugs between adjacent windings to prevent a flow of air from said passage-ways through said windings into the air-gap, or vice versa.

16. In a dynamo-electric machine, a rotatable member, a stationary member provided with ventilating passage-ways arranged substantially concentrically about the axis of said rotatable member, windings in said stationary member, plugs between adjacent windings to prevent a flow of air from said passage-ways through said windings into the air-gap or vice versa, and means for holding said windings in position in said stationary member, said means also serving to hold said plugs in position.

17. In a dynamo-electric machine, a rotatable member, and a stationary member, said stationary member having ventilating passage-ways open only at its outer periphery.

18. In a dynamo-electric machine, a rotatable member, a stationary member, said stationary member having a plurality of air passage-ways concentric with the axis of the machine, said air passage-ways extending from the outer periphery toward but not to the inner periphery of the stationary member.

19. In a dynamo-electric machine, a rotatable member, a stationary member, said stationary member having a plurality of air passage-ways, means for conducting air to and from said passage-ways, said passage-ways communicating with the air conducting means wholly at the outer periphery of said passage-ways.

20. In a dynamo-electric machine, a rotatable member, a stationary member surrounding said rotatable member, said stationary member having a core made up of groups of laminæ spaced apart to form air passageways concentric with the axis of the machine, and means for forcing air through the air passageways without bringing same into contact with the rotatable member.

21. In a dynamo-electric machine, a stationary core having a ventilating passage-way open only at the outer periphery of said core.

22. In a dynamo-electric machine, a stationary core made up of groups of laminæ spaced apart and providing ventilating passageway through which a cooling medium may pass, means for forcing a cooling medium through said passageway, and means for preventing the cooling medium from passing into the air gap of the machine.

23. The combination with a motor case having an air distributing chamber and an air exit passage; of a stator and a rotor mounted therein, and partitions between the stator parts to form continuous air passages from the distributing chamber to the air exit.

24. In a dynamo-electric machine, a rotor, a stator having ventilating passage-ways which permit a flow of air from the periphery of the machine through said passage-ways and out again at the periphery of the machine, in combination with means for confining the air to said passage-way while flowing through said stator so as to prevent same from entering the air-gap between the rotor and stator, radially arranged fan-blades mounted upon the end of the rotor for forcing a current of air to the periphery of the machine, and means for conducting said current of air to the passage-ways in said stator.

25. In a dynamo-electric machine, a rotor, a stator having ventilating passage-ways which permit a flow of air from the periphery of the machine through said passage-ways and out again at the periphery of the machine, in combination with means for confining the air to said passage-ways while flowing through said stator so as to prevent same from entering the air-gap between the rotor and the stator, radially arranged fan-blades mounted upon the end of the rotor for the purpose of forcing a current of air to the periphery of the machine, means for conducting said current of air to the passage-ways in said stator, and means also carried by the rotor for producing a current of air through the air-gap of the machine.

26. In a dynamo-electric machine, a stationary member having passage-ways formed therethrough, a rotatable member, and means for ventilating said members comprising means for supplying a blast of air to said stationary member, and for supplying an independent blast of air to said rotatable member.

27. In a dynamo-electric machine, a stationary member built up of grouped laminations and provided with passageways between said grouped laminations, a rotatable member, means for forcing a blast of air through the passage-ways of said stationary member, means for preventing said blast of air from entering the air-gap between the rotatable and stationary members, and means for supplying an independent blast of air to the periphery of said rotatable member through said air-gap.

28. In a dynamo-electric machine, a stationary member provided with ventilating passage-ways, a rotatable member, means for causing a current of air to flow through the air-gap between said members, means for causing a current of air to flow through said ventilating passage-ways, and means for preventing an intermingling of said air currents in the air gap.

29. In a dynamo-electric machine, a rotatable member, a stationary member provided with ventilating passage-ways arranged substantially concentrically about the axis of said rotatable member, means for cutting off direct communication between the said passage-ways and the air-gap of the machine, fan-blades carried by the rotatable member for producing an axial current of air through said air-gap, and means for forcing a current of air through said passage-ways, the currents of air in said air-gap and said passage-ways being entirely independent of each other.

30. In a dynamo-electric machine, a rotatable field magnet, a stationary armature having ventilating passage-ways which permit a flow of air from the periphery of the machine through said passage-ways and out again at the periphery of the machine, in combination with means for confining the air to said passage-ways while flowing through said stationary armature so as to prevent same from entering the air-gap between the rotatable field magnet and the armature, means for causing a flow of air through said passage-ways, and means for causing an independent flow of air through the air-gap substantially parallel to the axis of the rotatable field magnet.

31. In a dynamo-electric machine, a stationary member built up of laminæ and provided with a passageway, a rotatable member, means for forcing a blast of air through the passageway of said stationary member, means for preventing said blast of air in its passage through the machine from entering the air gap between the rotatable and stationary members, and means for supplying an independent blast of air to said rotatable member.

In testimony whereof I affix my signature in the presence of two witnesses.

CHARLES E. LORD.

Witnesses:
L. LOWENBERG,
FRED J. KINSEY.